US010554588B2

(12) United States Patent
Lou et al.

(10) Patent No.: US 10,554,588 B2
(45) Date of Patent: *Feb. 4, 2020

(54) ACTIVATING AND DEACTIVATION FUNCTIONAL UNITS OF A LINE CARD

(71) Applicant: Cisco Technology, Inc., San Jose, CA (US)

(72) Inventors: Jianquan Lou, Shanghai (CN); Ming Chi, Shanghai (CN); Haibin Tang, Shanghai (CN); Zhou Yang, Shanghai (CN); Jinghan Yu, Shanghai (CN); Qiuhua Zhu, Shanghai (CN); Joel Goergen, Soulsbyville, CA (US); Hugh Barrass, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/444,610

(22) Filed: Feb. 28, 2017

(65) Prior Publication Data

US 2017/0171116 A1 Jun. 15, 2017

Related U.S. Application Data

(63) Continuation of application No. 14/807,037, filed on Jul. 23, 2015, now Pat. No. 9,619,002.

(51) Int. Cl.
*G06F 1/32* (2006.01)
*H04L 12/861* (2013.01)
(Continued)

(52) U.S. Cl.
CPC ........ *H04L 49/9084* (2013.01); *G06F 1/3209* (2013.01); *G06F 1/3225* (2013.01);
(Continued)

(58) Field of Classification Search
CPC .... G06F 1/3206; G06F 1/3287; G06F 1/3278; G06F 13/1642; G06F 9/5083;
(Continued)

(56) References Cited

U.S. PATENT DOCUMENTS 9,075,607 B2   7/2015  Olsson et al.
9,619,002 B2 *  4/2017  Lou ...................... G06F 1/3234
(Continued)

OTHER PUBLICATIONS

International Preliminary Report on Patentability for PCT/US2016/042060 dated Jan. 23, 2018.

*Primary Examiner* — Michael J Brown
(74) *Attorney, Agent, or Firm* — Behmke Innovation Group LLC; James Behmke; Stephen D. LeBarron

(57) ABSTRACT

In some implementations, a method includes analyzing an amount of data communicated by a set of network interfaces. The data communicated by the set of network interfaces is processed by a set of functional units and a set of queues includes the data communicated by the set of network interfaces. The method also includes activating a first functional unit of the set of functional units when a first size of a first queue of the set of queues is above a first threshold. The method further includes deactivating the first functional unit of the set of functional units when the first size of the first queue of the set of queues is below a second threshold. The method further includes causing the data to be forward to one or more active functional units via a data interconnect coupled to the set of network interfaces and the set of functional units.

20 Claims, 10 Drawing Sheets

(51) Int. Cl.
  *G06F 1/3209*   (2019.01)
  *G06F 1/3234*   (2019.01)
  *G06F 1/3225*   (2019.01)
  *G06F 13/16*   (2006.01)
  *G06F 1/3206*   (2019.01)
  *G06F 1/3287*   (2019.01)
  *G06F 9/50*   (2006.01)
  *H04L 12/46*   (2006.01)
  *H04L 12/863*   (2013.01)
  *H04L 29/08*   (2006.01)
  *H04L 12/70*   (2013.01)

(52) U.S. Cl.
  CPC .......... *G06F 1/3234* (2013.01); *G06F 1/3275* (2013.01); *G06F 1/3278* (2013.01); *G06F 1/3206* (2013.01); *G06F 1/3287* (2013.01); *G06F 9/5083* (2013.01); *H04L 12/46* (2013.01); *H04L 47/6215* (2013.01); *H04L 49/90* (2013.01); *H04L 67/10* (2013.01); *H04L 2012/568* (2013.01); *Y02D 10/14* (2018.01); *Y02D 10/157* (2018.01); *Y02D 10/171* (2018.01); *Y02D 50/20* (2018.01)

(58) Field of Classification Search
  CPC ..... G06F 9/546; H04L 49/90; H04L 12/5693; H04L 47/6255; H04L 12/46
  USPC ................................ 713/300, 320, 323, 330
  See application file for complete search history.

(56) References Cited

U.S. PATENT DOCUMENTS

| | | |
|---|---|---|
| 2010/0235663 A1 | 9/2010 | Olsson et al. |
| 2011/0185195 A1* | 7/2011 | Tripathi .............. H04L 41/0816 713/300 |
| 2013/0191663 A1 | 7/2013 | Overcash et al. |
| 2014/0160919 A1 | 6/2014 | Kar et al. |

* cited by examiner

ACTIVATING AND DEACTIVATION FUNCTIONAL UNITS OF A LINE CARD

CROSS-REFERENCE TO RELATED APPLICATIONS

This application claims priority to U.S. patent application Ser. No. 14/807,037, filed on Jul. 23, 2015, which is hereby incorporated by reference in its entirety.

TECHNICAL FIELD

The present disclosure relates to line cards. In particular, the present disclosure relates to activating and/or deactivating functional units of line cards.

BACKGROUND

Network communication devices may be used to transmit and/or receive data between various computing devices (e.g., server computers, desktop computers, laptop computers, tablet computers, databases, etc.), other network communication devices, and/or networks (e.g., public networks such as the Internet and/or private networks such as local area networks (LANs) or virtual private networks (VPNs)). Examples of network communication devices include, but are not limited to, network switches, network routers, network hubs, blade switches, etc. The network communication devices may include one or more slots to receive one or more line cards. A line card may include one or more electronic circuits, such as functional units, on a printed circuit board (PCB). For example, the line card may include one or more processing devices (e.g., processors, application specific integrated circuits (ASICs), data processing engines (DPEs), forwarding engines (FEs), field-programmable gate arrays (FPGAs)), a flash memory, a random access memory, etc. The one or more line cards may be coupled to data and/or power interfaces (e.g., ports, communication lines, power lines, bus lines, etc.) in the network communication device. For example, the one or more line cards may be coupled to a backplane of the network communication device. This may allow the one or more line cards to receive power from the network communication device and/or transmit/receive data from the network communication device. A line card may allow a network communication device to interface and/or communicate with other communications devices and/or networks.

BRIEF DESCRIPTION OF THE FIGURES

The present disclosure will be understood more fully from the detailed description given below and from the accompanying drawings of some embodiments and/or illustrative implementations of the present disclosure, which, however, should not be taken to limit the present disclosure to the specific embodiments, but are for explanation and understanding only.

Figure 1:
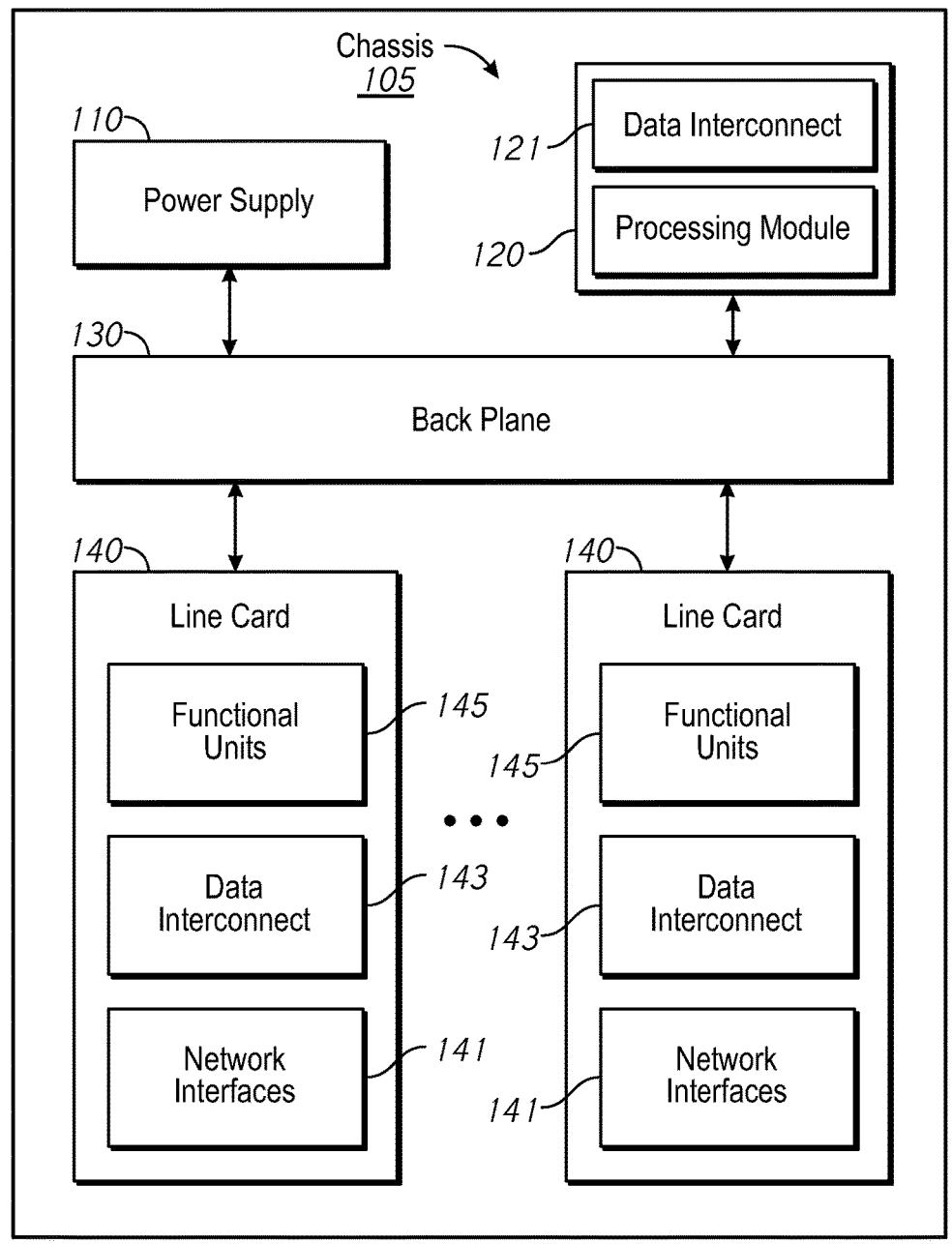
FIG. 1 is a diagram illustrating an example network communication device, according to one embodiment of the present disclosure.

In accordance with common practice, various features shown in the drawings may not be drawn to scale as the dimensions of various features may be arbitrarily expanded or reduced for clarity. Moreover, the drawings may not depict all of the aspects and/or variants of a given system, method and/or device disclosed by the present disclosure. Finally, like reference numerals may be used to denote like features throughout the specification and figures.

DESCRIPTION OF EXAMPLE EMBODIMENTS

Numerous details are described herein in order to provide a thorough understanding of the illustrative implementations shown in the accompanying drawings. However, the accompanying drawings show only some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein. Thus, the specific details set forth are merely examples. Particular implementations may vary from these example details and still be contemplated to be within the scope of the present disclosure.

Overview

Various implementations disclosed herein include apparatuses, systems, and methods for activating and/or deactivating functional units of a line card. For example, in some implementations, a method includes analyzing an amount of data communicated by a set of network interfaces. The data communicated by the set of network interfaces is processed by a set of functional units and a set of queues includes the data communicated by the set of network interfaces. The method also includes activating a first functional unit of the set of functional units when a first size of a first queue of the set of queues is above a first threshold. The method further includes deactivating the first functional unit of the set of functional units when the first size of the first queue of the set of queues is below a second threshold. The method further includes causing the data to be forward to one or more active functional units via a data interconnect coupled to the set of network interfaces and the set of functional units.

In other implementations, an apparatus includes a set of network interfaces configured to communicate data, a set of functional units associated with the set of network interfaces, and one or more processors. The apparatus also includes a memory including instructions that when executed cause the one or more processors to perform operations including analyzing an amount of data communicated by a set of network interfaces. The data communicated by the set of network interfaces is processed by a set of functional units and a set of queues includes the data communicated by the set of network interfaces. The operations also include activating a first functional unit of the set of functional units when a first size of a first queue of the set of queues is above a first threshold. The operations further include deactivating the first functional unit of the set of functional units when the first size of the first queue of the set of queues is below a second threshold. The operations further includes causing the data to be forward to one or more active functional units via a data interconnect coupled to the set of network interfaces and the set of functional units.

In other implementations, an apparatus includes a backplane configured communicate with a line card. The line card includes a set of network interfaces, a set of functional units associated with the set of network interfaces, and a data interconnect coupled to the set of network interfaces and the set of functional units. The apparatus also includes one or more processors coupled to the backplane a memory comprising instructions that when executed cause the one or more processors to perform operations including analyzing an amount of data communicated by the set of network interfaces. The data communicated by the set of network interfaces is processed by a set of functional units and a set of queues includes the data communicated by the set of network interfaces. The operations also includes activating a first functional unit of the set of functional units when a first size of a first queue of the set of queues is above a first threshold. The operations further includes deactivating the first functional unit of the set of functional units when the first size of the first queue of the set of queues is below a second threshold. The operations further include causing the data to be forward to one or more active functional units via the data interconnect.

Detailed Description

FIG. 1 is a diagram illustrating an example network communication device 100, according to one embodiment of the present disclosure. The network communication device 100 may be a device that may transmit and/or receive data between various computing devices (e.g., server computers, desktop computers, laptop computers, tablet computers, databases, etc.), other network communication devices (e.g., other network switches/routers), and/or networks (e.g., public networks such as the Internet and/or private networks such as local area networks (LANs) or virtual private networks (VPNs)). Examples of network communication devices may include, but are not limited to, network switches, network routers, network hubs, blade switches, etc. As illustrated in FIG. 1, the network communication device 100 includes a chassis 105 (e.g., a housing, an enclosure, etc.). The chassis 105 may be constructed of various metallic, plastic, and/or polymer materials. The network communication device 100 also includes a power supply 110, a processing module 120, a backplane 130, and one or more line cards 140 (e.g., a plurality of line cards).

In one embodiment, the power supply 110 may be a device, component, module, etc., that provides power (e.g., electric energy) to a load (e.g., an electrical load). For example, the power supply 110 may provide power to the line cards 140 and/or the processing module 120 (as discussed below). The power supply 110 may also convert one form of electrical energy to another (e.g., convert alternating current (AC) to direct current (DC)). The power supply 110 may receive power from various power sources such as a wall outlet. Example of power supplies include, but are not limited to, AC power supplies, DC power supplies, AC-to-DC power supplies, etc. The power provided by the power supply 110 may be used to operate components of the network communication device and/or the line cards 140.

The chassis 105 may include a plurality of slots (not shown in the figures). The slots may be arranged horizontally and/or vertically in the chassis 105. It shall be understood that in other embodiments, the number and/or arrangement of the slots may vary. For example, the network communication device 100 may include any number of slots and/or the slots may be arranged in various layouts. Each of the slots may be configured to receive a line card 140. The slots of the chassis 105 may be arranged such that the line cards 140 are aligned with connectors, ports, and/or interfaces in the backplane 130.

In one embodiment, the backplane 130 may be a set of connectors/interfaces that are coupled to each other via a set of electrical connections (e.g., wires, pins, traces, etc.). The set of connectors/interfaces and the set of electrical connections may be placed on and/or within a circuit board, such as a printed circuit board (PCB). Each line card 140 may include a connector/interface that allows the line card 140 to be plugged (e.g. inserted) into a connector/interface on the backplane 130. The set of connectors/interfaces and the set of electrical connections of the backplane 130 may allow data to be communicated between individual line cards 140 and/or between a line card 140 and the processing module 120. The set of connectors/interfaces and the set of electrical connections of the backplane 130 may also allow the power supply 110 to provide power to the line cards 140 and/or the processing module 120.

As discussed above, the line card 140 may include one or more electronic circuits/components on a printed circuit board (PCB). For example, each line card 140 may include one or more functional units 145 (e.g., a forwarding engine, a data processing engine, memory, etc.), a data interconnect 143, and/or one or more network interfaces 141. The line card 140 may allow a network communication device 100 to interface and/or communicate with other communications devices and/or networks via the one or more network interfaces 141. In one embodiment, the network interfaces 141 may include pluggable transceiver modules (e.g., small form-factor pluggable (SFP) transceiver modules, optical transceiver modules, copper transceiver modules, etc.), that are inserted into ports of a line card 140. The pluggable transceiver modules (not shown in the figures) may be configured to accept/connect to cables/cable connectors (e.g., Ethernet cables/connectors, fiber optic cables/connectors, etc.) and may be configured to transmit and/or receive data via the cables/cable connectors. Examples of pluggable transceiver modules may include, but are not limited to, small form-factor pluggable (SFP) transceiver modules, optical transceiver modules, copper transceiver modules, etc. In another embodiment, the network interfaces 141 may be ports/connectors that are configured to accept/connect to cables/cable connectors.

As discussed above, the network communication device 100 may use power provided by the power supply 110 to operate the components of the network communication device 100. The network communication device 100 may operate on a continuous basis and may use (e.g., consume) a large amount of power during operation. The line cards 140 may use a large portion of the power provided by the power supply 110. For example, the line cards 140 may use around sixty-five percent of the power provided by the power supply 110. It shall be understood that sixty-five percent is an example and that in other embodiments, the line cards 140 may use more or less than sixty-five percent of the power provided by the power supply 110. It may be useful and/or desirable to reduce the amount of power used by the line cards 140. Reducing the amount of power used by the line cards 140 may help reduces the cost to operate the network communication device 100. Reducing the amount of power used by the line cards 140 may also help reduce the environmental impact of operating the network communication devices. Reducing the amount of power used by the line cards 140 may also reduce the amount of heat generated by the line cards 140 which may increase the performance of the line cards 140 and may increase the lifespan of the line cards 140.

The processing module 120 includes a data interconnect 121. The data interconnect 121 may allow the processing module 120 to forward data received from a first line card 140 (via the backplane 130) to a second line card 140 (via the backplane 140). For example, the processing module 120 may receive data from a data processing engine of the first line card and may forward the data to a second data processing engine of the second line card via the data interconnect 121. The data interconnect 121 may include a plurality of ports and/or connections (e.g., electrical connections, optical connections, etc.) between the plurality of ports (as discussed in more detail below). Although the data interconnect 121 is illustrated as part of the processing module 121, in other embodiments, the data interconnect 121 may be separate from the processing module 120.

In one embodiment, the processing module 120 may reduce the amount of power used by the line cards 140 by de-activating one or more of the functional units 145 of the line cards 140 (as discussed in more detail below). The data interconnects 143 of the line cards may be reconfigured to forward (e.g., route) data between the network interfaces 141 and the functional units 145 that are active (e.g., the functional units 145 that have not been deactivated). The functional units 145 (of a line card 140) that are active may be referred to as active functional units. The functional units 145 (of a line card 140) that have been deactivated may be referred to as deactivated functional units. In another embodiment, the processing module 120 may activate one or more functional units 145 (e.g. may activate one or more deactivated functional units) of the line cards 140 (as discussed in more detail below). Activating previously deactivated functional units may allow the line card 140 to continue to process and/or analyze data in a timely manner when the amount of data communicated by the network interfaces 141 increases. The processing module 120 may activate and/or deactivate one or more functional units 145 based on one or more queues (e.g., data queues) associated with the one or more functional units 145 and/or based on a rate of increase/decrease in the amount of data communicated by a line card 140 (as discussed in more detail below).

In one embodiment, the processing module 120 may also reduce the amount of power used by the network communication device 100 by activating and/or deactivating one or more portions of the data interconnect 121. For example, as different functional units of a line card 140 are deactivated, different portions the data interconnect 121 may transfer less data to and from the line card 140. This may allow the processing module 120 to deactivate portions and/or components (e.g., optical engines, lasers, circuits, etc.) of the data interconnect 121. The deactivated portions and/or components of the data interconnect 121 may be activated (e.g., re-activated) as different functional units of the line card are activated 140 (e.g., re-activated).

Figure 2A:
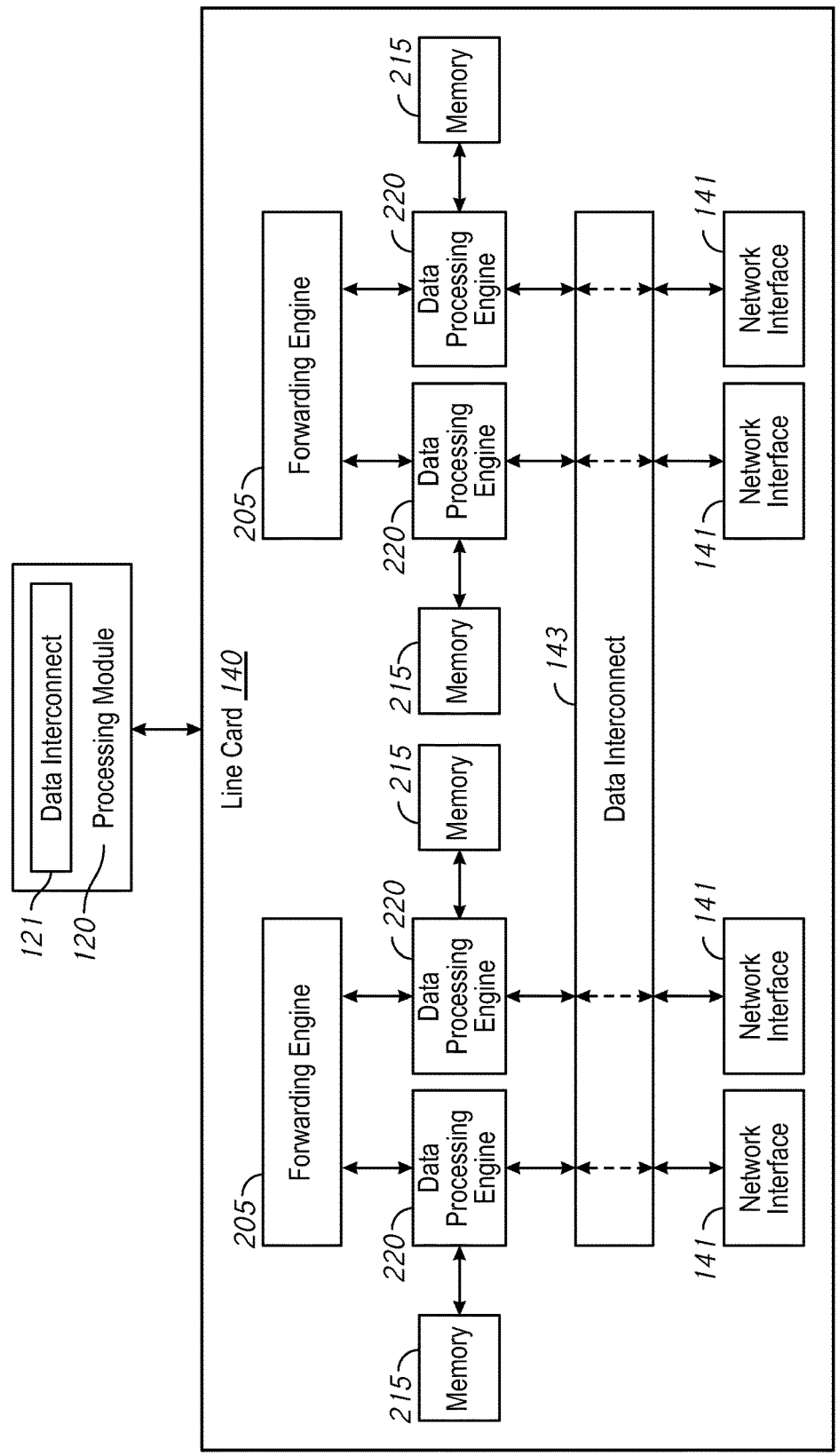
FIG. 2A is a diagram illustrating an example line card, according to one embodiment of the present disclosure.

FIG. 2A is a diagram illustrating an example line card 140, according to one embodiment of the present disclosure. The line card 140 includes forwarding engines 205, data processing engines 220, memories 215, a data interconnect 143, and network interfaces 141. The forwarding engines, 205, the data processing engines 220, and the memories 215 may be examples of functional units (e.g., examples of functional units 145 illustrated in FIG. 1). As illustrated in FIG. 2A, each forwarding engine 205 is coupled to two data processing engines 220. Each data processing engine 220 is coupled to a memory 215. The data processing engines 220 are coupled to the data interconnect 143 and the network interfaces are coupled to the data interconnect 143. As discussed above and as illustrated in FIG. 1, the line card 140 may be coupled to the processing module 120 via a backplane (e.g., via backplane 130 illustrated in FIG. 1).

As discussed above, the network interfaces 141 may include pluggable transceiver modules and/or ports/connectors that are configured to accept/connect to cables. The network interfaces 141 may communicate (e.g., transmit and/or receive) data with computing devices, network communication devices, and/or networks. The data received by a network interface 141 may be analyzed by the data processing engine 220 and/or the forwarding engine 205 (as discussed in more detail below). Network interfaces 141 may also receive data from the data processing engine 220 and/or the forwarding engine 205 (as discussed in more detail below).

In one embodiment, a forwarding engine 205 may determine where the data was received from and/or where the data should be forwarded to (e.g., may determine an address where the data was received from or an address where the data should be forwarded to). For example, the forwarding engine 205 may perform a route lookup function to determine where to forward data. The forwarding engine 205 may also include the destination (e.g., where to forward the data) in a message and/or packet. In another embodiment, a data processing engine 220 may analyze and/or process data (e.g., packets, messages, etc.) that is received via a network interface 141. The data processing engine 220 may forward data to different line cards 140. For example, based on the destination determine by the forwarding engine 205, the data processing engine 220 may forward the data to a different line card 140 in the network communication device.

As discussed above, the processing module 120 may activate and/or deactivate functional units, such as the forwarding engine 205 and/or the data processing engine 220 based on one or more queues (e.g., one or more data queues) associated with the forwarding engines 205 and/or the data processing engines 220. In one embodiment, the queues may reside (e.g., may be stored) in the memories 215 of the line card 140. In other embodiments, the queues may also reside in other memories (not illustrated in FIG. 2A) of the line card 140. The queues may include data communicated (e.g., transmitted and/or received) by the network interfaces 141. In one embodiment, each queue may be associated with a functional unit. For example, each queue may be associated with a data processing engine 220.

The processing module 120 may analyze the queues associated with the forwarding engines 205 and/or the data processing engines 220. In one embodiment, the processing module 120 may analyze the sizes of the queues (e.g., the amount of data in the queues). The processing module 120 may activate one or more forwarding engines 205 and/or data processing engines 220 when the size of a queue exceeds different thresholds (as discussed in more detail below). The processing module 120 may also deactivate one or more forwarding engines 205 and/or data processing engines 220 when the size of a queue falls below different thresholds (as discussed in more detail below). In another embodiment, the processing module 120 may analyze the rate of increase and/or the rate of decrease in the amount of data communicated by the network interfaces 141. If the rate of increase in the amount of data communicated by the network interfaces 141 exceeds a first threshold, the processing module 120 may activate a functional unit (e.g., a forwarding engine 205 and/or a data processing engine 220). If the rate of increase in the amount of data communicated by the network interfaces 141 exceeds a second threshold, the processing module 120 may activate multiple functional units (e.g., multiple forwarding engines 205 and/or data processing engines 220). If the rate of decrease in the amount of data communicated by the network interfaces 141 exceeds a third threshold, the processing module 120 may deactivate a functional unit (e.g., a forwarding engine 205 and/or a data processing engine 220). If the rate of decrease in the amount of data communicated by the network interfaces 141 exceeds a fourth threshold, the processing module 120 may deactivate multiple functional units (e.g., multiple forwarding engines 205 and/or data processing engines 220).

In one embodiment, the processing module 120 may determine the rate of increase and/or rate of decrease in the amount of data communicated by the network interfaces 141 by requesting and/or receiving periodic messages, reports, etc., from the network interfaces 141. The messages, reports, etc., may indicate the amount of data communicated by the network interfaces at a particular time. In another embodiment, the processing module 120 may not analyze the queues directly. The processing module may receive periodic messages, reports, etc., from the data processing engines 220 and/or the forwarding engines 205. The periodic message, reports, etc., may indicate the amount of data in each queue (e.g., the size of the queue).

In one embodiment, the processing module 120 may cause the data communicated by the network interfaces 141 to be forwarded to the forwarding engines 205 and/or data processing engines 220 that are active (e.g., to active functional units). For example, the processing module 120 may send commands, packets, messages, etc., to the data interconnect 143. The data interconnect 143 may enable and/or disable one or more communication lines to forward the data communicated by the network interfaces 141 to the forwarding engines 205 and/or data processing engines 220 that are active (as discussed below), based on the commands, packets, messages, etc.

As illustrated in FIG. 2A, all of the forwarding engines 205, the data processing engines 220, and the memories 215 are active (e.g., all of the functional units are active). The data interconnect 143 may be configured (e.g., via commands, packets, messages, etc., received from the processing module 120) to forward the data received from each network interface 141 to a respective data processing engine 220 (as illustrated by the dotted lines within the data interconnect 143). As discussed above the data communicated by the network interfaces 141 may be forwarded to the forwarding engines 205 by the data processing engines 220.

Figure 2B:
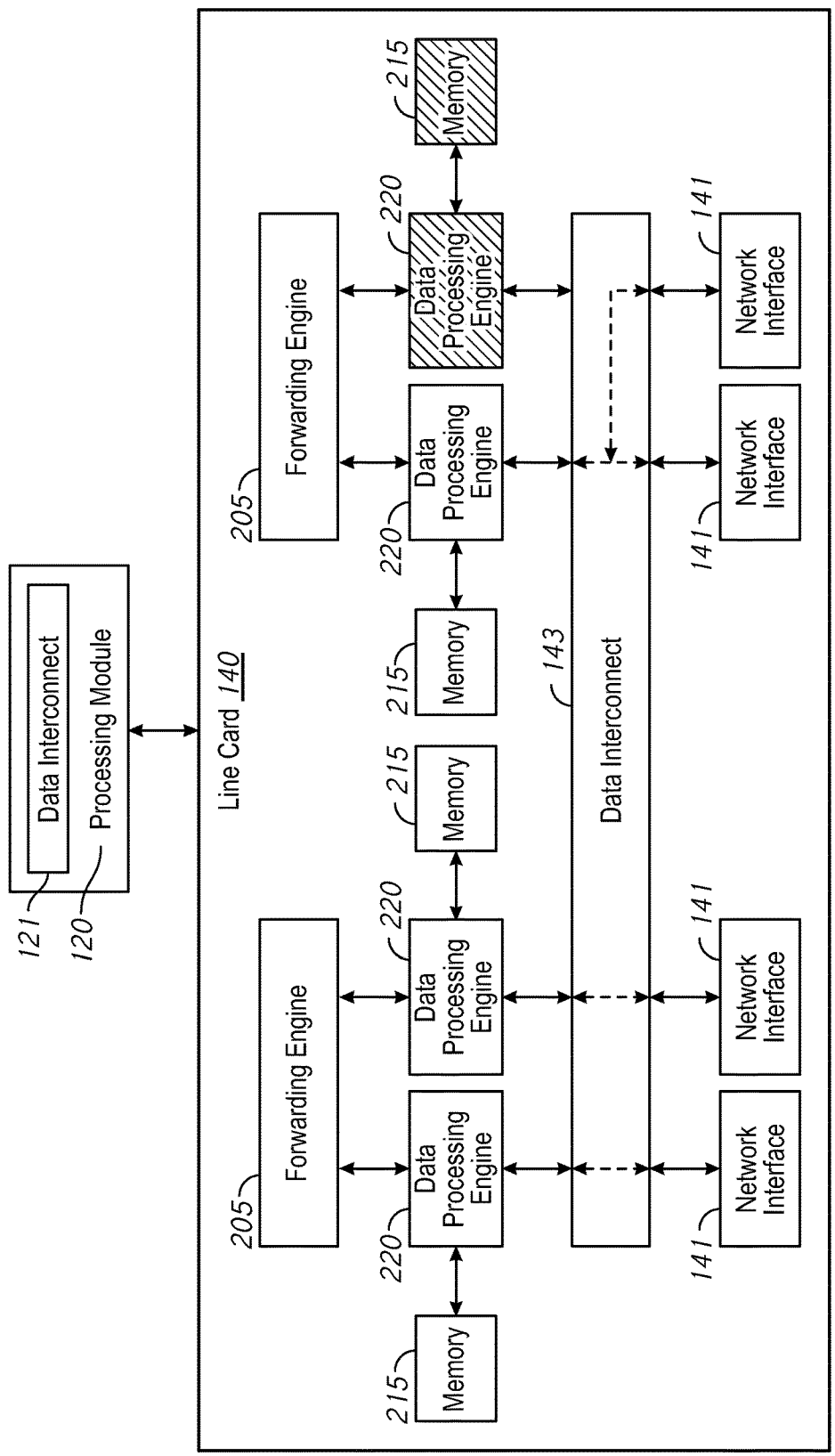
FIG. 2B is a diagram illustrating an example line card, according to one embodiment of the present disclosure.

FIG. 2B is a diagram illustrating an example line card 140, according to one embodiment of the present disclosure. As discussed above, the line card 140 includes forwarding engines 205, data processing engines 220, memories 215, a data interconnect 143, and network interfaces 141. Each forwarding engine 205 is coupled to two data processing engines 220. Each data processing engine 220 is coupled to a memory 215. The data processing engines 220 are coupled to the data interconnect 143 and the network interfaces are coupled to the data interconnect 143. The line card 140 may be coupled to the processing module 120 via a backplane (e.g., via backplane 130 illustrated in FIG. 1). As discussed above, the network interfaces 141 may communicate (e.g., transmit and/or receive) data with computing devices, network communication devices, and/or networks. The data received by a network interface 141 may be analyzed and/or processed by the data processing engines 220 and/or the forwarding engines 205, as discussed above.

As discussed above, the processing module 120 may activate and/or deactivate functional units, such as the forwarding engine 205 and/or the data processing engine 220 based on one or more queues (e.g., e.g., one or more data queues) associated with the forwarding engines 205 and/or the data processing engines 220. As illustrated in FIG. 2B, one data processing engine 220 and one memory 215 (e.g., the rightmost data processing engine 220 and the rightmost memory 215) have been deactivated (e.g., is not active, is not operating, etc.), as indicated by the hash marks through the rightmost data processing engine 220 and the rightmost memory 215. Also as discussed above, the processing module 120 may cause the data communicated by the network interfaces 141 to be forwarded to the forwarding engines 205 and/or data processing engines 220 that are active (e.g., to active functional units). The data interconnect 143 may enable and/or disable one or more communication lines to forward the data communicated by the network interfaces 141 to the forwarding engines 205 and/or data processing engines 220 that are active based on the commands, packets, messages, etc., received from the processing module 120. For example, as illustrated in FIG. 2B, the data interconnect 143 may forward (e.g., reroute) the data received by the rightmost network interface 141 to the second rightmost data processing engine 220.

Figure 2C:
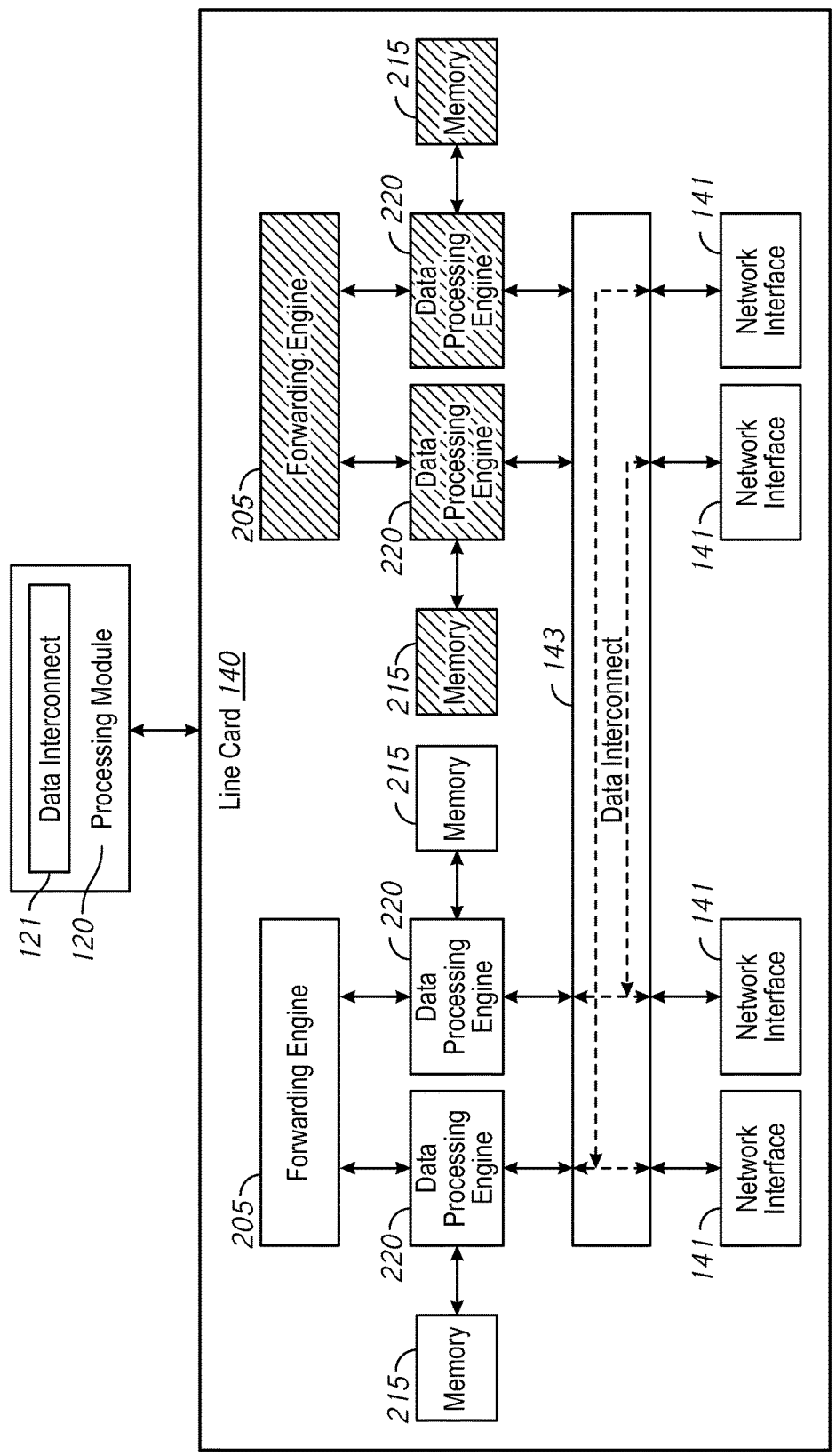
FIG. 2C is a diagram illustrating an example line card, according to one embodiment of the present disclosure.

FIG. 2C is a diagram illustrating an example line card 140, according to one embodiment of the present disclosure. As discussed above, the line card 140 includes forwarding engines 205, data processing engines 220, memories 215, a data interconnect 143, and network interfaces 141. Each forwarding engine 205 is coupled to two data processing engines 220. Each data processing engine 220 is coupled to a memory 215. The data processing engines 220 are coupled to the data interconnect 143 and the network interfaces are coupled to the data interconnect 143. The line card 140 may be coupled to the processing module 120 via a backplane (e.g., via backplane 130 illustrated in FIG. 1). As discussed above, the network interfaces 141 may communicate (e.g., transmit and/or receive) data with computing devices, network communication devices, and/or networks. The data received by a network interface 141 may be analyzed and/or processed by the data processing engines 220 and/or the forwarding engines 205, as discussed above.

As discussed above, the processing module 120 may activate and/or deactivate functional units, such as the forwarding engine 205 and/or the data processing engine 220 based on one or more queues (e.g., e.g., one or more data queues) associated with the forwarding engines 205 and/or the data processing engines 220. As illustrated in FIG. 2C, a forwarding engine 205, two data processing engines 220, and two memories 215 (e.g., the rightmost forwarding engine 205, the two rightmost data processing engines 220, and the two rightmost memories 215) have been deactivated, as indicated by the hash marks through the rightmost forwarding engine 205, the two rightmost data processing engines 220, and the two rightmost memories 215. Also as discussed above, the processing module 120 may cause the data communicated by the network interfaces 141 to be forwarded to the forwarding engines 205 and/or data processing engines 220 that are active (e.g., to active functional units). The data interconnect 143 may enable and/or disable one or more communication lines to forward the data communicated by the network interfaces to the forwarding engines 205 and/or data processing engines 220 that are active based on the commands, packets, messages, etc., received from the processing module 120. For example, as illustrated in FIG. 2C, the data interconnect 143 may forward (e.g., reroute) the data received by the rightmost network interface 141 to the leftmost data processing engine 220. The data interconnect 143 may also forward the data received by the second rightmost network interface 141 to the second leftmost data processing engine 220.

Figure 2D:
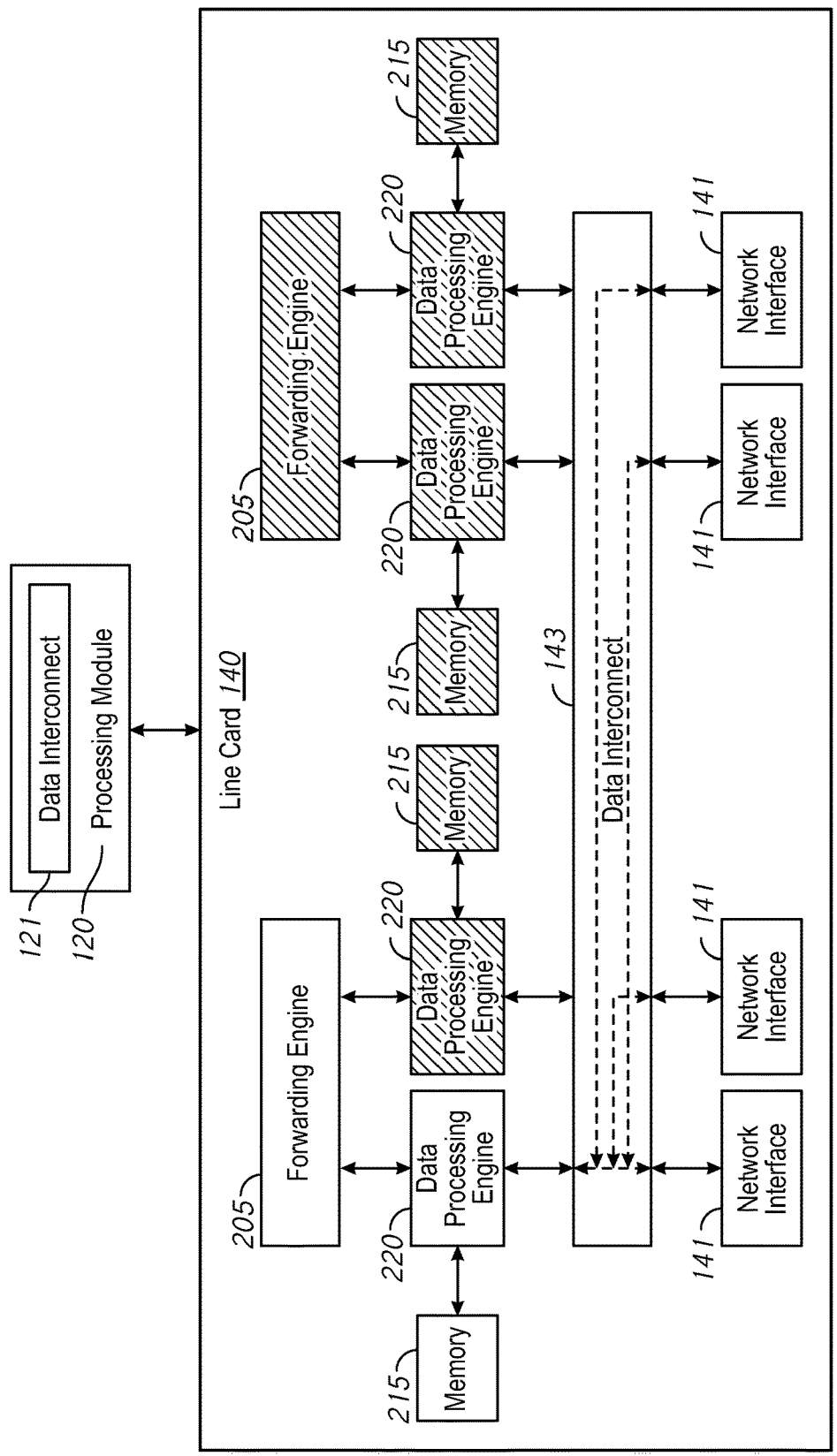
FIG. 2D is a diagram illustrating an example line card, according to one embodiment of the present disclosure.

FIG. 2D is a diagram illustrating an example line card 140, according to one embodiment of the present disclosure. As discussed above, the line card 140 includes forwarding engines 205, data processing engines 220, memories 215, a data interconnect 143, and network interfaces 141. Each forwarding engine 205 is coupled to two data processing engines 220. Each data processing engine 220 is coupled to a memory 215. The data processing engines 220 are coupled to the data interconnect 143 and the network interfaces are coupled to the data interconnect 143. The line card 140 may be coupled to the processing module 120 via a backplane (e.g., via backplane 130 illustrated in FIG. 1). As discussed above, the network interfaces 141 may communicate (e.g., transmit and/or receive) data with computing devices, network communication devices, and/or networks. The data received by a network interface 141 may be analyzed and/or processed by the data processing engines 220 and/or the forwarding engines 205, as discussed above.

As discussed above, the processing module 120 may activate and/or deactivate functional units, such as the forwarding engine 205 and/or the data processing engine 220 based on one or more queues (e.g., e.g., one or more data queues) associated with the forwarding engines 205 and/or the data processing engines 220. As illustrated in FIG. 2D, a forwarding engine 205, three data processing engines 220, and three memories 215 (e.g., the rightmost forwarding engine 205, the three rightmost data processing engines 220, and three rightmost memories 215) have been deactivated, as indicated by the hash marks through the forwarding engine 205, the data processing engines 220, and the memories 215. Also as discussed above, the processing module 120 may cause the data communicated by the network interfaces 141 to be forwarded to the forwarding engines 205 and/or data processing engines 220 that are active (e.g., to active functional units). The data interconnect 143 may enable and/or disable one or more communication lines to forward the data communicated by the network interfaces to the forwarding engines 205 and/or data processing engines 220 that are active based on the commands, packets, messages, etc., received from the processing module 120. For example, as illustrated in FIG. 2D, the data interconnect 143 may forward (e.g., reroute) the data received by the rightmost network interface 141 to the leftmost data processing engine 220. The data interconnect 143 may also forward the data received by the second rightmost network interface 141 to the leftmost data processing engine 220. The data interconnect 143 may further forward the data received by the second leftmost network interface 141 to the leftmost data processing engine 220.

Although the processing module 120 is illustrated as being separate from the line card 140 in FIGS. 2A through 2D, it shall be understood that in other embodiments, the processing module 120 may be located in the line card 140. It shall be also be understood that in other embodiments, the line card 140 may include various other types of functional units (not shown in the figures) and the functional units may be arranged and/or connected in various configurations. In one embodiment, functional units may be circuits, devices, components, and/or modules that may analyze and/or process the data communicated by the network interfaces 141.

In one embodiment, the processing module 120 may deactivate one or more components/portions of the data interconnect 121 based on one or more queues (e.g., one or more data queues) associated with the forwarding engines 205 and/or the data processing engines 220 and/or based on the number of active functional units of the line card 140. For example, when all of the functional units of the line card 140 are active, more or all of the components/portions of the data interconnect 121 (e.g., optical engines, lasers, circuits, etc.) may be activate in order to forward the data received from the functional units of the line card 140. When functional units are deactivated (as illustrated in FIG. 2D), components/portions of the data interconnect 121 may be deactivated because fewer functional units are activate and less data may be received. When more functional units are active (as illustrated in FIGS. 2A and 2B), components/portions of the data interconnect 121 may be activated because more functional units are activate and more data may be received. Deactivating components/portions of the data interconnect 121 may allow a network communication device to reduce the amount of power used because the portions/components of the data interconnect 121 (e.g., lasers, circuits, optical engines, etc.) that are deactivated may not use power. In another embodiment, the processing module 120 may deactivate one or more portions/components of the data interconnect 121 based on a rate of increase and/or decrease in the amount of data in the one or more queues.

In one embodiment, the processing module 120 may transmit data and/or information about the one or more queues to a server (not shown in the figures). For example, the processing module 120 may transmit data indicating the number of functional units that are activate in one or more line cards 140 to the server. In another example, the processing module 120 may transmit data indicating the amount of data in the one or more queues to the server. The server may control the amount of power or electricity generated and/or used by a building and/or a power grid (e.g., an electrical power grid of a power company). The server may analyze the data received from the processing module 120 (and/or other processing modules 120 in other network communication devices) to determine power usage patterns of a building or a geographical location. This may allow the server to adjust the resources of a power grid. For example, if a set of network communication devices in a building is consuming less power, the server may adjust the resources of the power grid so that additional power may be provided to other locations (e.g., other buildings).

Figure 3:
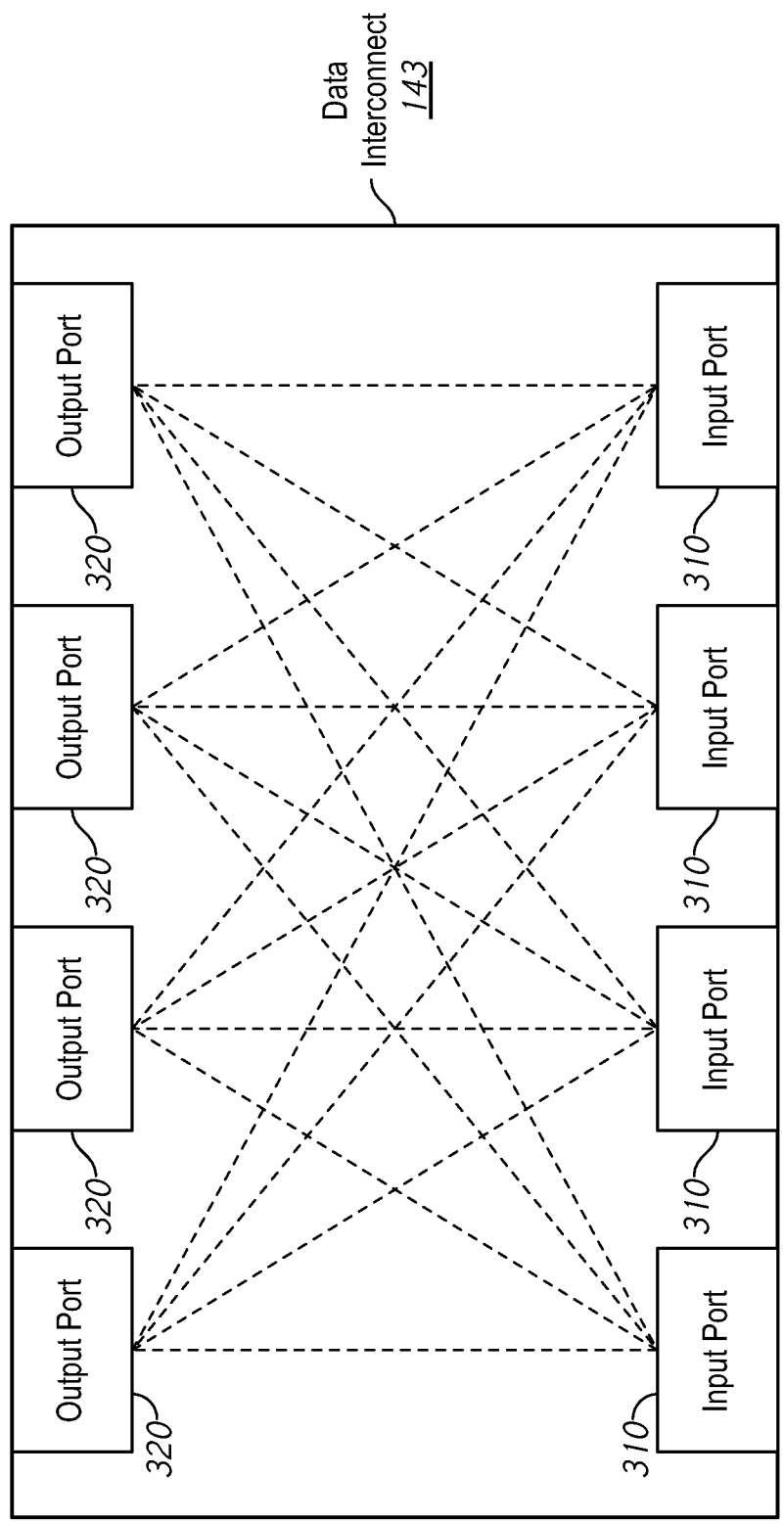
FIG. 3 is a diagram illustrating an example data interconnect, according to one embodiment of the present disclosure.

FIG. 3 is a diagram illustrating an example data interconnect 143, according to one embodiment of the present disclosure. As illustrated in FIG. 3, the data interconnect 143 includes input ports 310 (e.g., a set of input ports) and output ports 320 (e.g., a set of output ports). The data interconnect 143 also includes a plurality of connections (e.g., optical connections and/or electrical connections such as wires, pins, traces, etc.) as indicated by the dotted lines between the input ports 310 and the output ports 320. Each input port 310 is coupled to each output port 320 by a connection from the plurality of connections. Each output port 320 is coupled to each input port 310 by a connection from the plurality of connections.

Each of the connections may be enabled and/or disabled based on commands, packets, messages, etc., received from a processing module (e.g., processing module 120 illustrated in FIGS. 1 through 2D). By enabling and/or disabling different sets of the connections, the data interconnect 143 may be able to forward the data received from an input port 310 to any of the output ports 320. For example (referring to FIGS. 2A through 2D), the input ports 310 may be coupled to network interfaces 141 and the output ports may be coupled to the data processing engines 220. Referring to FIG. 2B, the connections of the data interconnect 143 may be selectively enabled and/or disabled (based on commands, packets, messages, etc., received from a processing module) such that the data received by the rightmost network interface 141 is forwarded to the second rightmost data processing engine 220. Referring to FIG. 2C, the connections of the data interconnect 143 may be selectively enabled and/or disabled (based on commands, packets, messages, etc., received from a processing module) such that the data received by the rightmost network interface 141 is forwarded to the leftmost data processing engine 220. The connections of the data interconnect 143 may be also selectively enabled and/or disabled (based on commands, packets, messages, etc., received from a processing module) such that the data received by the second rightmost network interface 141 is forwarded to the second leftmost data processing engine 220. Referring to FIG. 2D, the connections of the data interconnect 143 may be selectively enabled and/or disabled (based on commands, packets, messages, etc., received from a processing module). The connections of the data interconnect 143 may also be selectively enabled and/or disabled (based on commands, packets, messages, etc., received from a processing module) such that the data received by the rightmost network interface 141 is forwarded to the leftmost data processing engine 220. The connections of the data interconnect 143 may further be selectively enabled and/or disabled (based on commands, packets, messages, etc., received from a processing module) such that the data received by the second rightmost network interface 141 is forwarded to the leftmost data processing engine 220 and such that the data received by the second leftmost network interface 141 is forwarded to the leftmost data processing engine 220.

In one embodiment, the data interconnect 143 may include optical connections such as fiber optic lines/cables, light pipes, etc. The data interconnect 143 may further include optical engines which may be coupled to functional units and/or line cards. In one embodiment, the optical engines may be configured to receive electrical signals and covert the received electrical signals to optical signals. The optical engine may also be configured to receive optical signals and convert the received optical signals to electrical signals. The optical engines may also include lasers which may be used to transmit and/or receive data via the optical connections.

In other embodiments, the data interconnect 143 may include one or more of connections (e.g., electrical connections, optical connections), circuits (e.g., multiplexers, crossbar switches/circuits, etc.), memories (e.g., flash memory, random access memory, etc.), a fabric chip, a crosspoint chips/switch, etc. It shall be understood that the data interconnect 143 may include any components and/or modules that may be used to connect each input port 310 to each output port 320 and to selectively enable and/or disable connections between the input ports 310 and the output ports 320. It shall also be understood that the input ports 310 may transmit data, the output ports 320 may receive data, and the connections between the input ports 310 and the output ports 320 may be bidirectional. The data interconnect 143 may also be referred to as a fabric.

In one embodiment, the different portions of the data interconnect 143 may also be deactivated (e.g., shut down) and/or activated (e.g., re-activated or turned on), as discussed herein. For example, the data interconnect 143 may include multiple fabric chips and/or multiple optical engines. One or more of the fabric chips and/or optical engines may be deactivated and/or activated.

Although FIG. 3 may refer to data interconnect 143, the connections (e.g., electrical connections, optical connections), circuits (e.g., multiplexers, crossbar switches/circuits, etc.), memories (e.g., flash memory, random access memory, etc.), fabric chips, crosspoint chips/switches, lasers, optical engines, etc., of the data interconnect 143 may also be included in data interconnect 121 (illustrated in FIGS. 1 through 2D).

Figure 4:
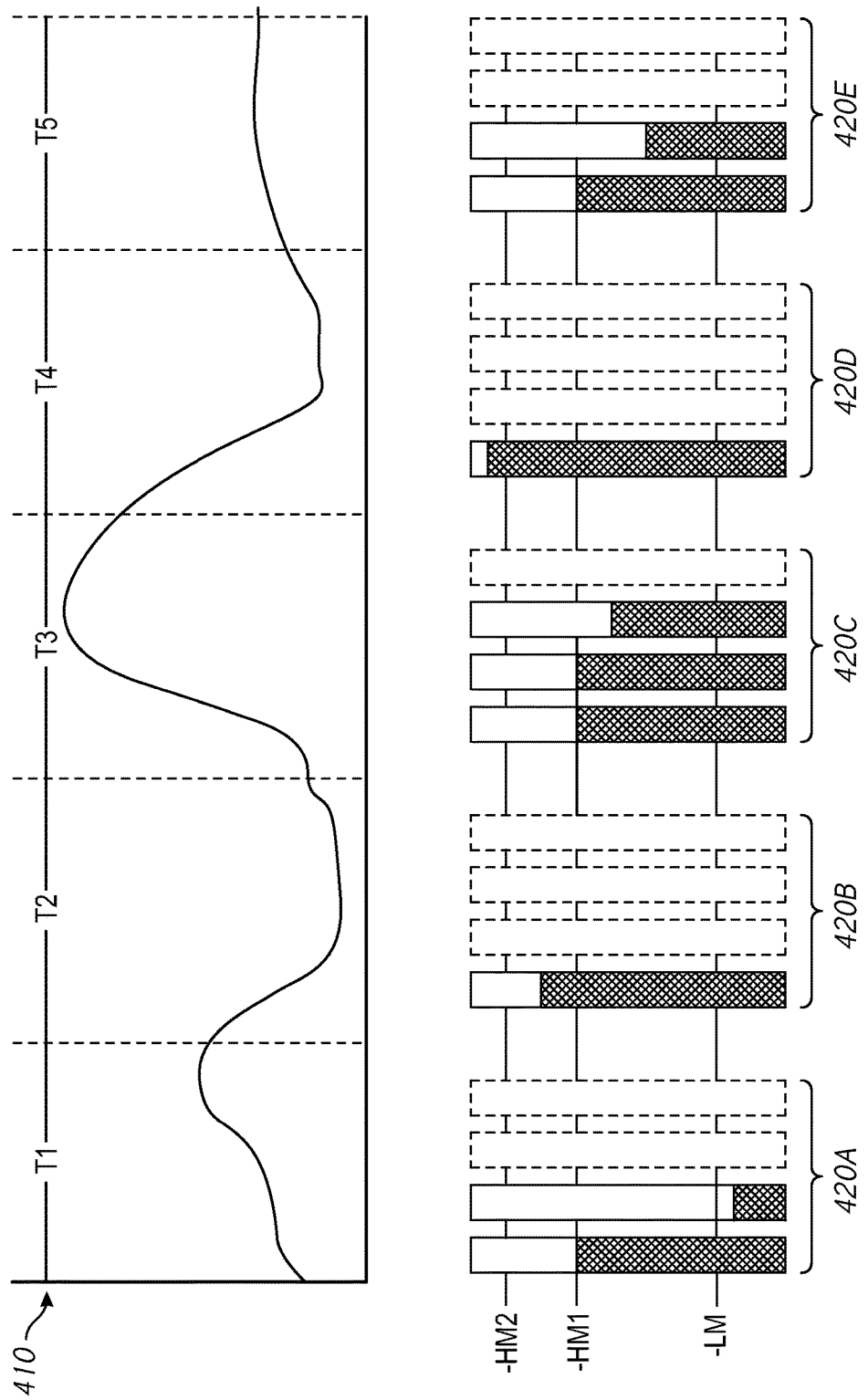
FIG. 4 is a diagram illustrating an example graph indicating the amount of data communicated by a line card over a period of time and illustrating the amount of data in example sets of queues over the period of time, according to one embodiment of the present disclosure.

FIG. 4 is a diagram illustrating an example graph 410 indicating the amount of data communicated by a line card over a period of time and illustrating the amount of data in example set of queues 420A through 420E over the period of time, according to one embodiment of the present disclosure. As discussed above, the network interfaces of a line card may communicate data with network communication devices, computing devices, and/or networks. The graph 410 illustrates example amounts of data communicated by the line card (e.g., by the network interfaces of the line card) over a period of time. The X-axis of the graph 410 represents different points in time and the Y-axis of the graph 410 represents the amount of data communicated at the different points in time. As illustrated in FIG. 4, the graph 410 is divided into five time periods, T1, T2, T3, T4, and T5. The sets of queues 420A through 420E illustrate the amount of data in the queues of the line card during each of the five time periods. For example, the set of queues 420A illustrate the amount of data in the queues of the line card during time period T1, the set of queues 420B illustrate the amount of data in the queues of the line card during time period T2, etc.

The set of queues 420A through 420E also illustrate example thresholds (e.g., threshold amounts of data) that may be used by a processing module (e.g., processing module 120 illustrated in FIGS. 1 through 2D) to determine whether to activate and/or deactivate one or more functional units (e.g., data processing engines, forwarding engines, etc.). The example thresholds may also be used by the processing module to activate and/or deactivate portions/components of a data interconnect (e.g., data interconnect 121). As illustrated in FIG. 4, three different thresholds may be used by the processing module to determine whether to activate and/or deactivate one or more functional units: LM, HM1, HM2. It shall be understood that the thresholds LM, HM1 and HM2 are merely examples and that different thresholds may be used in other embodiments.

In one embodiment, each queue in the sets of queues 420A through 420E may be associated with a functional unit. Referring to FIG. 2A through 2D, the leftmost queue in sets of queues 420A through 420E may be associated with the leftmost data processing engine 220, the second leftmost queue in sets of queues 420A through 420E may be associated with the second leftmost data processing engine 220, the rightmost queue in sets of queues 420A through 420E may be associated with the rightmost data processing engine 220, and the second rightmost queue in sets of queues 420A through 420E may be associated with the second rightmost data processing engine 220. In one embodiment, queues represented with a solid rectangle may be associated with functional units that are active and queues represented with a dashed rectangle may be associated with functional units that are deactivated.

In one embodiment, the processing module may determine a size of a queue. If the amount of data in the queue exceeds a threshold (e.g., a size threshold) such as HM2 for a period of time (e.g., 5 seconds, 1 minute, 5 minutes, etc.), the processing module may activate a functional unit (e.g., may activate a data processing engine, a forwarding engine, etc.). The processing module may also activate a portion/component of a data interconnect (e.g., data interconnect 121 illustrated in FIG. 1) if the rate of increase in the amount in the queue exceeds a threshold such as HM2 for a period of time. In another embodiment, the processing module may determine the rate of increase in the amount of data communicated by the line card. If the rate of increase in the amount of data communicated by the line card exceeds a second rate threshold, the processing module may activate a functional unit (e.g., may activate a data processing engine). The processing module may determine whether the rate of increase exceeds the second rate threshold based on the following equation:

$$S \geq \frac{MA}{T} \qquad (1)$$

where S is the rate of increase in the amount of data communicated by the line card, where MA is the marginal load of a functional unit (e.g., the amount of space in the queue before the amount of data in the queue reaches HM2), and where T is the amount of time to activate a new functional unit. The processing module may also activate a portion/component of a data interconnect (e.g., data interconnect 121 illustrated in FIG. 1) if the rate of increase in the amount of data communicated by the line card exceeds the second threshold. In a further embodiment, if the rate of increase in the amount of data communicated by the line card exceeds a first rate threshold, the processing module may activate multiple functional units (e.g., may activate multiple data processing engines and/or forwarding engines). The processing module may determine whether the rate of increase exceeds the first rate threshold based on the following equation:

$$S \geq \frac{(0.2 * queueSize) + MA}{T} \qquad (2)$$

where S is the rate of increase in the amount of data communicated by the line card, where queueSize is the size of a queue (e.g., the total amount of space in the queue), where MA is the marginal load of a functional unit (e.g., the amount of space in the queue before the amount of data in the queue reaches HM2), and where T is the amount of time to activate a new functional unit. In one embodiment, the equations (1) and (2) may also be used to activate and/or deactivate portions/components of a data interconnect (e.g., data interconnect 121 illustrated in FIGS. 1 through 2D). It should be understood that the equations (1) and (2) are merely examples and that other embodiments may use different equations and/or various of the equations (1) and (2).

In one embodiment, if the amount of data in the queue drops below a threshold (e.g., a size threshold) such as LM for a period of time (e.g., 1 second, 30 seconds, 5 minutes, etc.), the processing module may deactivate a functional unit (e.g., may activate a data processing engine, a forwarding engine, etc.). The processing module may also deactivate a portion/component of a data interconnect (e.g., data interconnect 121 illustrated in FIG. 1) if the rate of increase in the amount in the queue drops below a threshold such as LM for a period of time. In another embodiment, the processing module may determine the rate of decrease in the amount of data communicated by the line card. If the rate of decrease in the amount of data communicated by the line card exceeds a fourth rate threshold, the processing module may deactivate a functional unit (e.g., may deactivate a data processing engine). The processing module may determine whether the rate of decrease exceeds the fourth rate threshold based on the following equation:

$$M - \frac{TR * N}{HM1} = 1 \qquad (3)$$

where M is the number of active functional units, where TR if the average amount of data communicated in a period of time, and where N is the total number of functions units on a line card. The processing module may deactivate a functional unit when equation (3) is true. In a further embodiment, if the rate of decrease in the amount of data communicated by the line card exceeds a third rate threshold, the processing module may deactivate multiple functional units (e.g., may deactivate multiple data processing engines and/or forwarding engines). The processing module may determine whether the rate of decrease exceeds the third rate threshold based on the following equation:

$$M - \frac{TR * N}{HM1} > 1 \qquad (4)$$

where M is the number of active functional units, where TR if the average amount of data communicated in a period of time, and where N is the total number of functions units on a line card. The processing module may deactivate multiple functional units when equation (4) is true. In one embodiment, the equations (3) and (4) may also be used to activate and/or deactivate portions/components of a data interconnect (e.g., data interconnect 121 illustrated in FIGS. 1 through 2D). It should be understood that the equations (3) and (4) are merely examples and that other embodiments may use different equations and/or various of the equations (3) and (4).

During time period T1, the two leftmost queues of the set of queues 420A have data and the two rightmost queues of the set of queues 420A have no data. Referring to FIG. 2A, the two leftmost data processing engines 220 and the leftmost forwarding engine 205 may be active and the two rightmost data processing engines 220 and the right most forwarding engine 205 may be deactivated. As illustrated in the set of queues 420A, the amount of data in the second leftmost queue is below the threshold LM. During time period T2, the processing module may deactivate a functional unit because the amount of data in a queue of the set of queues 420A is below the threshold LM for a period of time (e.g., 5 seconds, 1 minute, 5 minutes, etc.). The data in the second leftmost queue of the set of queues 420A may be moved (e.g., inserted, copied, etc.) into the leftmost queue of the set of queues 420A as illustrated by the set of queues 420B. Referring to FIG. 2A, the leftmost data processing engine 220 and the leftmost forwarding engine 205 may remain active and the second leftmost data processing engine 220 may be deactivated. The processing module may also deactivate a portion/component of a data interconnect (e.g., data interconnect 121 illustrated in FIGS. 1 through 2D).

During time period T3, the amount of data communicated by the line card (e.g., the amount of data communicated by the network interfaces of the line cards) increases, as illustrated in the graph 410. As discussed above, the processing module may determine that the amount of increase in the data communicated by the line card exceeds a second rate threshold based on equation (2). The processing device may activate multiple functional units (e.g., multiple data processing engines and/or multiple forwarding engines) during the time period T3. Referring to FIG. 2A, the middle two data processing engines 220 and the rightmost forwarding engine 205 may be activated. As illustrated by the data queues 420C, the three leftmost queues (corresponding to the three leftmost data processing engines 220 in FIG. 2A) have data to be analyzed and/or processed. The processing module may also activate multiple portions/components of a data interconnect (e.g., data interconnect 121 illustrated in FIGS. 1 through 2D).

During time period T4, the amount of data communicated by the line card (e.g., the amount of data communicated by the network interfaces of the line cards) decrease, as illustrated in the graph 410. As discussed above, the processing module may determine that the rate of decrease in the data communicated by the line card exceeds a fourth rate threshold based on equation (4). The processing device may deactivate multiple functional units (e.g., multiple data processing engines and/or multiple forwarding engines) during the time period T4. Referring to FIG. 2A, the middle two data processing engines 220 and the rightmost forwarding engine 205 may be deactivated. As illustrated by the data queues 420D, the leftmost queue (corresponding to the leftmost data processing engine 220 in FIG. 2A) has data to be analyzed and/or processed. The processing module may also deactivate multiple portions/components of a data interconnect (e.g., data interconnect 121 illustrated in FIGS. 1 through 2D).

During time period T5, the amount of data communicated by the line card (e.g., the amount of data communicated by the network interfaces of the line cards) increases, as illustrated in the graph 410. As discussed above, the processing module may determine that the amount of data in a queue of the set of queues 420D. The processing module may determine that the leftmost queue in the set of queues 420D has exceeded the threshold HM2 for a period of time (e.g., 5 seconds, 2 minutes, etc.). The processing device may activate a functional unit (e.g., a data processing engine and/or a forwarding engine) during the time period T5. Referring to FIG. 2A, the two second leftmost data processing engine 220 may be activated. As illustrated by the data queues 420E, the two leftmost queues (corresponding to the two leftmost data processing engines 220 in FIG. 2A) have data to be analyzed and/or processed. The processing module may also activate a portion/component of a data interconnect (e.g., data interconnect 121 illustrated in FIGS. 1 through 2D).

In one embodiment, the processing module may determine a minimum number of functional units that should remain active based on the following equation:

$$X = \frac{TR * N}{HM1} \quad (5)$$

where X is the minimum number of functional units that should remain active, where TR if the average amount of data communicated in a period of time, and where N is the total number of functions units on a line card. When X results in a fractional number or a decimal number, X may be rounded up to the next whole number. The processing module may compare X with the number of functional units that are active. If the number of functional units that are active is greater than X, the processing module may deactivate one or more functional units such that the number of active functional units is equal to X. If the number of functional units that are active is less than X, the processing module may activate one or more functional units such that the number of functional units that are active is equal to X. The processing module may also activate and/or deactivate one or more portions/components of a data interconnect (e.g., data interconnect 121 illustrated in FIGS. 1 through 2D) to forward the data communicated by the minimum number of functional units between line cards.

Figure 5:
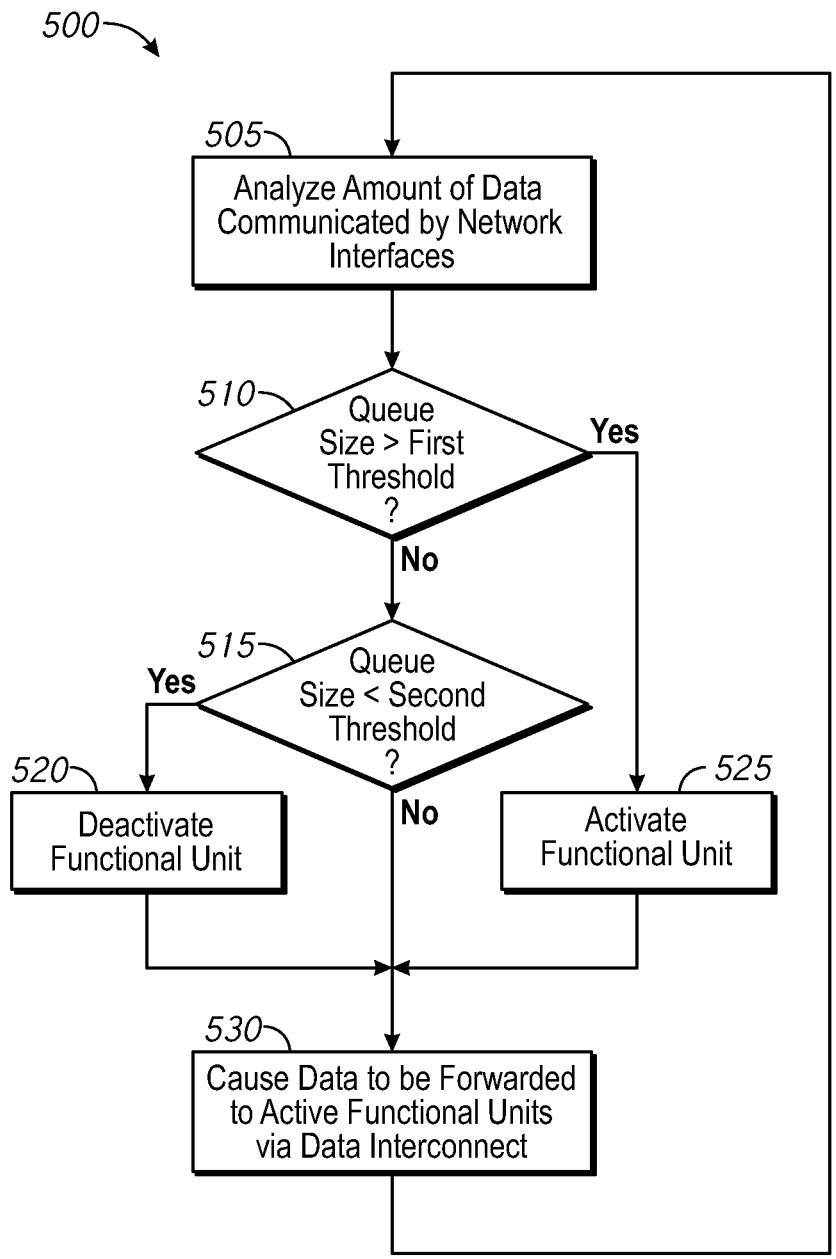
FIG. 5 is a flowchart representation of a method of activating and/or deactivating functional units, according to one embodiment of the present disclosure.

FIG. 5 is a flowchart representation of a method 500 of activating and/or deactivating functional units, in accordance with some embodiments. In some implementations, the method 500 may be performed by a processing module (e.g., processing module 120 illustrated in FIG. 1). The processing module may include hardware (e.g., circuitry, dedicated logic, programmable logic, microcode, etc.), software (e.g., instructions run on a processor to perform hardware simulation), firmware, or a combination thereof. Briefly, method 500 includes analyzing an amount of data communicated by a set of network interfaces and activating/deactivating a functional unit based on a size of a queue.

The method 500 begins at block 505 where the method 500 analyzes the amount of data communicated (e.g., transmitted and/or received) by a set of network interfaces (of a line card). For example, the method 500 may analyze the size of a queue (e.g., the amount of data in a queue). The method 500 may determine whether the size of the queue (e.g., the queue size) is greater than a first threshold (e.g., is greater than HM2 illustrated in FIG. 4) for a period of time (e.g., 5 seconds, 30 seconds, 2 minutes, etc.) at block 510. If the size of the queue is greater than a first threshold for the period of time, the method 500 may activate a functional unit (e.g., a data processing engine, a forwarding engine, etc.) at block 525. The method 500 may also activate a portion/component of a data interconnect (e.g., data interconnect 121 illustrated in FIGS. 1 through 2D). If the size of the queue is not greater than the first threshold, the method 500 may determine whether the size of the queue (e.g., the queue size) is less than a second threshold (e.g., is less than LM illustrated in FIG. 4) for a period of time (e.g., 5 seconds, 30 seconds, 2 minutes, etc.) at block 515. If the size of the queue is less than the second threshold for the period of time, the method 500 may deactivate a functional unit at block 520. The method 500 may also deactivate a portion/component of a data interconnect (e.g., data interconnect 121 illustrated in FIGS. 1 through 2D).

The method 500 may cause data to be forwarded to one or more activate functional units (e.g., to the functional units that remain active and/or have not been deactivated) at block 530. For example, the method 500 may cause a data interconnect (e.g., data interconnect 143 illustrated in FIGS. 2A through 3) to forward data to the one or more active functional units by sending one or more messages, commands, etc., to the data interconnect (as discussed above). The data interconnect may enable and/or disable one or more connections (e.g., electrical connections) based on the one or more messages, commands, etc., as discussed above.

Figure 6:
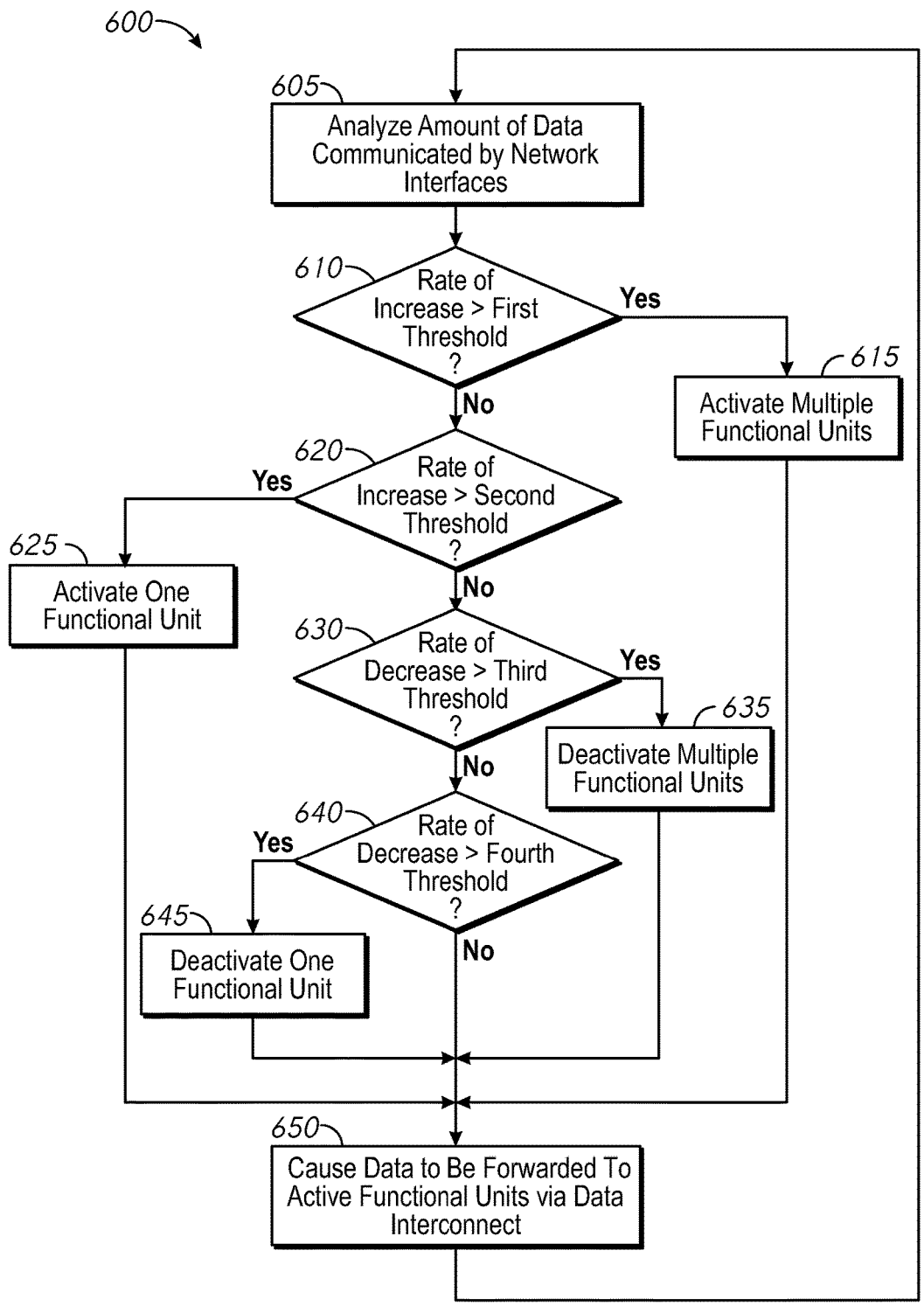
FIG. 6 is a flowchart representation of a method of activating and/or deactivating functional units, according to one embodiment of the present disclosure.

FIG. 6 is a flowchart representation of a method 600 of activating and/or deactivating functional units, in accordance with some embodiments. In some implementations, the method 600 may be performed by a processing module (e.g., processing module 120 illustrated in FIG. 1). The processing module may include hardware (e.g., circuitry, dedicated logic, programmable logic, microcode, etc.), software (e.g., instructions run on a processor to perform hardware simulation), firmware, or a combination thereof. Briefly, method 600 includes analyzing the amount of data communicated by a set of network interfaces and activating/deactivating one or more functional units based on the rate of increase or the rate of decrease in the amount of data communicated by the set of network interfaces.

The method 600 begins at block 605 where the method 600 analyzes the amount of data communicated (e.g., transmitted and/or received) by a set of network interfaces (of a line card). For example, the method 600 may determine a rate of increase and/or a rate of decrease in the amount of data communicated by the set of network interfaces (as discussed above).

The method 600 may determine whether the rate of increase in the amount of data communicated by the set of network interfaces is greater than a first threshold (e.g., a first rate threshold) at block 610. For example, the method 600 may use equation (2) to determine whether the rate of increase in the amount of data communicated by the set of network interfaces is greater than the first threshold (as discussed above). If the rate of increase is greater than the first threshold, the method 600 may activate multiple functional units (e.g., multiple data processing engines and/or multiple forwarding engines) at block 615 (as discussed above). The method 600 may also activate multiple portions/components of a data interconnect (e.g., data interconnect 121 illustrated in FIGS. 1 through 2D).

The method 600 may determine may determine whether the rate of increase in the amount of data communicated by the set of network interfaces is greater than a second threshold (e.g., a second rate threshold) at block 620 if the rate of increase is not greater than the first threshold. For example, the method 600 may use equation (1) to determine whether the rate of increase in the amount of data communicated by the set of network interfaces is greater than the second threshold (as discussed above). If the rate of increase is greater than the second threshold, the method 600 may activate a functional unit (e.g., a data processing engine and/or a forwarding engine) at block 625 (as discussed above). The method 600 may also activate a portion/component of a data interconnect (e.g., data interconnect 121 illustrated in FIGS. 1 through 2D).

The method 600 may determine whether the rate of decrease in the amount of data communicated by the set of network interfaces is greater than a third threshold (e.g., a third rate threshold) at block 630 if the rate of increase is not greater than the second threshold. For example, the method 600 may use equation (4) to determine whether the rate of decrease in the amount of data communicated by the set of network interfaces is greater than the third threshold (as discussed above). If the rate of decrease is greater than the third threshold, the method 600 may deactivate multiple functional units (e.g., multiple data processing engines and/or multiple forwarding engines) at block 635 (as discussed above). The method 600 may also deactivate multiple portions/components of a data interconnect (e.g., data interconnect 121 illustrated in FIGS. 1 through 2D).

The method 600 may determine may determine whether the rate of decrease in the amount of data communicated by the set of network interfaces is greater than a fourth threshold (e.g., a second rate threshold) at block 640 if the rate of decrease is not greater than the third threshold. For example, the method 600 may use equation (3) to determine whether the rate of decrease in the amount of data communicated by the set of network interfaces is greater than the fourth threshold (as discussed above). If the rate of decrease is greater than the fourth threshold, the method 600 may deactivate a functional unit (e.g., a data processing engine and/or a forwarding engine) at block 645. The method 600 may also deactivate a portion/component of a data interconnect (e.g., data interconnect 121 illustrated in FIGS. 1 through 2D).

The method 600 may cause data to be forwarded to one or more activate functional units (e.g., to the functional units that remain active and/or have not been deactivated) at block 650. For example, the method 600 may cause a data interconnect (e.g., data interconnect 143 illustrated in FIGS. 2A through 3) to forward data to the one or more active functional units by sending one or more messages, commands, etc., to the data interconnect (as discussed above). The data interconnect may enable and/or disable one or more connections (e.g., electrical connections) based on the one or more messages, commands, etc., as discussed above.

Figure 7:
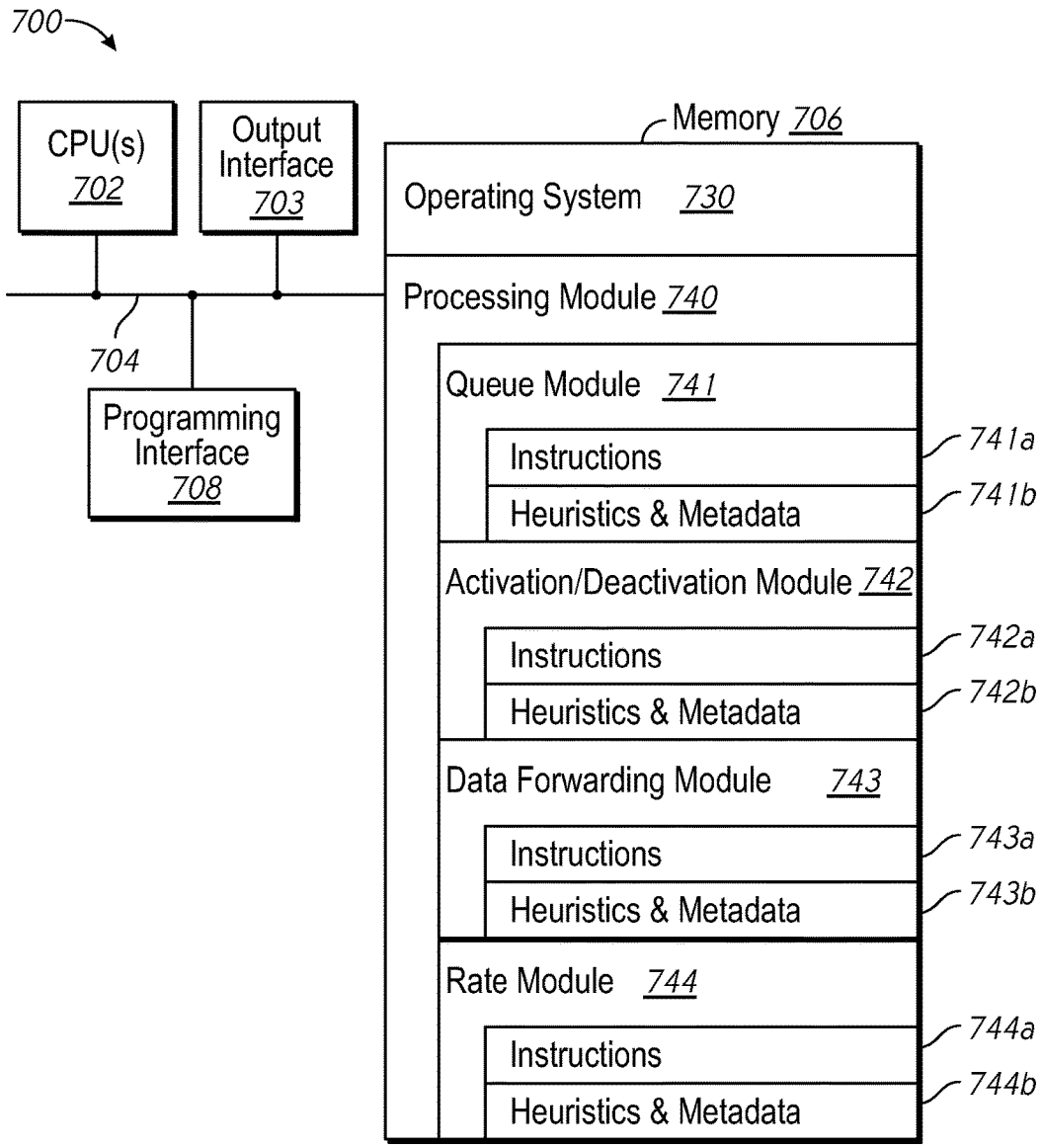
FIG. 7 is a block diagram of a computing device, in accordance with some embodiments.

FIG. 7 is a block diagram of a computing device 700, in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 700 includes one or more processing units (CPU's) 702 (e.g., processors), one or more output interfaces 703, a memory 706, a programming interface 708, and one or more communication buses 704 for interconnecting these and various other components.

In some embodiments, the communication buses 704 include circuitry that interconnects and controls communications between system components. The memory 706 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 706 optionally includes one or more storage devices remotely located from the CPU(s) 702. The memory 706 comprises a non-transitory computer readable storage medium. Moreover, in some embodiments, the memory 706 or the non-transitory computer readable storage medium of the memory 706 stores the following programs, modules and data structures, or a subset thereof including an optional operating system 730 and a processing module 740. In some embodiments, one or more instructions are included in a combination of logic and non-transitory memory. The operating system 730 includes procedures for handling various basic system services and for performing hardware dependent tasks. In some embodiments, the processing module 740 may be configured to analyze an amount of data communicated by a set of network interfaces, activate one or more functional units, deactivate one or more functional units, and/or cause the data to be forwarded to one or more active functional units. To that end, the processing module 740 includes a queue module 741, an activation/deactivation module 742, a data forwarding module 743, and a rate module 744.

In some embodiments, the queue module 741 may analyze a queue, may determine a size of the queue, and may determine whether the size of the queue is greater and/or less than various thresholds. To that end, the queue module 741 includes a set of instructions 741a and heuristics and metadata 741b. In some embodiments, the activation/deactivation module 742 may activate and/or deactivate one or more functional units of a line card. To that end, the activation/deactivation module 742 includes a set of instructions 742a and heuristics and metadata 742b. In some embodiments, the data forwarding module 743 may cause data to be forwarded to one or more active functional units of a line card. To that end, the data forwarding module 743 includes a set of instructions 743a and heuristics and metadata 743b. In some embodiments, the rate module 744 may determine a rate of increase and/or rate of decrease in the amount of data communicated by a set of network interfaces. To that end, the rate module 744 includes a set of instructions 744a and heuristics and metadata 744b.

Although the processing module 740, the queue module 741, the activation/deactivation module 742, the data forwarding module 743, and the rate module 744 are illustrated as residing on a single computing device 700, it should be understood that in other embodiments, any combination of the processing module 740, the queue module 741, the activation/deactivation module 742, the data forwarding module 743, and the rate module 744 may reside on separate computing devices.

Moreover, FIG. 7 is intended more as functional description of the various features which may be present in a particular embodiment as opposed to a structural schematic of the embodiments described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact. Also as used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

Further as used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the disclosure provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
analyzing an amount of data communicated by a set of two or more network interfaces operating in concert on a line card, wherein the data communicated by the set of two or more network interfaces is processed by a set of functional units, wherein the set of a functional units include at least a forwarding engine or a data processing engine;
configuring, based on analyzing the amount of data, a data interconnect coupled to the set of two or more network interfaces and the set of functional units, wherein the data interconnect enables and disables one or more communication lines to forward the data communicated by the two or more network interfaces to functional units that are active on the line card; and
causing the data communicated by the set of two or more network interfaces to be forwarded to one or more of the set of functional units via the data interconnect.

2. The method of claim 1, wherein configuring the data interconnect comprises at least one of enabling or disabling the one or more communication lines between the set of two or more network interfaces and the set of functional units.

3. The method of claim 1, wherein configuring the data interconnect comprises:
disabling a communication line between a first network interface of the set of two or more network interfaces and a first functional unit of the set of functional units; and
enabling a communication line between the first network interface of the set of two or more network interfaces and a second functional unit of the set of functional units.

4. The method of claim 1, wherein analyzing the amount of data communicated by the set of two or more network interfaces comprises determining that a size of a queue associated with a first functional unit of the set of functional units greater than a threshold, wherein configuring the data interconnect comprises disabling a communication line between a first network interface of the set of two or more network interfaces and the first functional unit and enabling a communication line between the first network interface and a second functional unit of the set of functional units, the method further comprising activating the second functional unit.

5. The method of claim 1, wherein analyzing the amount of data communicated by the set of two or more network interfaces comprises determining that a size of a queue associated with a first functional unit of the set of functional units is less than a threshold, wherein configuring the data interconnect comprises disabling a communication line between a first network interface of the set of two or more network interfaces and the first functional unit and enabling a communication line between the first network interface and a second functional unit of the set of functional units, the method further comprising deactivating the first functional unit.

6. The method of claim 1, wherein analyzing the amount of data communicated by the set of two or more network interfaces comprises determining a rate of change in the amount of data communicated by the set of two or more network interfaces, and wherein configuring the data interconnect comprises determining a number of communication lines of the data interconnect to enable and disable based on the rate of change.

7. The method of claim 6, wherein determining the number of communication lines of the data interconnect to enable and disable based on the rate of change comprises determining a first number in response to the rate of change being above a first threshold and determining a second number in response to the rate of change being above a second threshold.

8. The method of claim 6, further comprising determining a number of functional units to enable or disable based on the rate of change and enabling or disabling the determined number of functional units.

9. The method of claim 1, wherein configuring the data interconnect comprises activating or deactivating one or more physical components of the data interconnect.

10. The method of claim 1, wherein the set of functional units comprises one or more of:
a forwarding engine, a data processing engine, or a memory.

11. An apparatus, comprising:
a set of two or more network interfaces operating in concert to communicate data on a line card;
a set of functional units associated with the set of network interfaces, wherein the set of functional units include at least a forwarding engine or a data processing engine;
one or more processors; and
a memory comprising instructions that when executed cause the one or more processors to perform operations comprising:
analyzing an amount of data communicated by the set of two or more network interfaces;
configuring, based on analyzing the amount of data, a data interconnect coupled to the set of two or more network interfaces and the set of functional units, wherein the data interconnect enables and disables one or more communication lines to forward the data communicated by the two or more network interfaces to functional units that are active on the line card; and
causing the data communicated by the set of two or more network interfaces to be forwarded to one or more of the set of functional units via the data interconnect.

12. The apparatus of claim 11, wherein configuring the data interconnect comprises at least one of enabling or disabling the one or more communication lines between the two or more network interfaces and the set of functional units.

13. The apparatus of claim 11, wherein configuring the data interconnect comprises:
disabling a communication line between a first network interface of the set of two or more network interfaces and a first functional unit of the set of functional units; and
enabling a communication line between the first network interface of the set of two or more network interfaces and a second functional unit of the set of functional units.

14. The apparatus of claim 11, wherein analyzing the amount of data communicated by the set of two or more network interfaces comprises determining that a size of a queue associated with a first functional unit of the set of functional units greater than a threshold, wherein configuring the data interconnect comprises disabling a communication line between a first network interface of the set of two or more network interfaces and the first functional unit and enabling a communication line between the first network interface and a second functional unit of the set of functional units, the method further comprising activating the second functional unit.

15. The apparatus of claim 11, wherein analyzing the amount of data communicated by the set of two or more network interfaces comprises determining that a size of a queue associated with a first functional unit of the set of functional units is less than a threshold, wherein configuring the data interconnect comprises disabling a communication line between a first network interface of the set of two or more network interfaces and the first functional unit and enabling a communication line between the first network interface and a second functional unit of the set of functional units, the method further comprising deactivating the first functional unit.

16. The apparatus of claim 11, wherein analyzing the amount of data communicated by the set of two or more network interfaces comprises determining a rate of change in the amount of data communicated by the set of network interfaces, and wherein configuring the data interconnect comprises determining a number of communication lines of the data interconnect to enable and disable based on the rate of change.

17. The apparatus of claim 11, wherein configuring the data interconnect comprises activating or deactivating one or more physical components of the data interconnect.

18. An apparatus, comprising:
a backplane configured communicate with two or more line cards, wherein each of the two or more line cards comprises a set of two or more network interfaces operating in concert, a set of functional units associated with the set of network interfaces, and a data interconnect coupling the set of two or more network interfaces and the set of functional units, wherein the set of functional units include at least a forwarding engine or a data processing engine and the data interconnect enables and disables one or more communication lines to forward the data communicated by the two or more network interfaces to functional units that are active;
one or more processors coupled to the backplane; and
a memory comprising instructions that when executed cause the one or more processors to perform operations comprising:
analyzing an amount of data communicated by the set of two or more network interfaces;
configuring, based on analyzing the amount of data, the data interconnect; and
causing the data communicated by the set of two or more network interfaces to be forwarded to one or more of the set of functional units via the data interconnect.

19. The apparatus of claim 18, wherein analyzing the amount of data communicated by the set of two or more network interfaces comprises determining a rate of change in the amount of data communicated by the set of two or more network interfaces, and wherein configuring the data interconnect comprises determining a number of communication lines of the data interconnect to enable and disable based on the rate of change.

20. The apparatus of claim 18, wherein configuring the data interconnect comprises activating or deactivating one or more physical components of the data interconnect.

* * * * *